(12) United States Patent
Steenbergen

(10) Patent No.: US 6,912,187 B2
(45) Date of Patent: Jun. 28, 2005

(54) METHOD AND SYSTEM FOR TIME COMPENSATION OF RE-WRITABLE OPTICAL MEDIA WRITE PARAMETERS

(75) Inventor: Christiaan Steenbergen, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 333 days.

(21) Appl. No.: 10/361,284

(22) Filed: Feb. 10, 2003

(65) Prior Publication Data

US 2004/0156280 A1 Aug. 12, 2004

(51) Int. Cl.$^7$ ................................................. G11B 7/00
(52) U.S. Cl. ............................... 369/47.28; 369/47.21; 369/53.34; 369/59.19
(58) Field of Search ........................... 369/47.1, 47.11, 369/47.15, 47.21, 47.22, 47.27, 47.28, 47.48, 53.1, 53.34, 59.1, 59.19

(56) References Cited

U.S. PATENT DOCUMENTS

| | | | |
|---|---|---|---|
| 6,154,437 | 11/2000 | Utsunomiya et al. | 369/275.2 |
| 6,407,976 | 6/2002 | Nagara et al. | 369/116 |
| 6,445,669 | 9/2002 | Hattori et al. | 369/116 |
| 6,469,968 | 10/2002 | Van Den Enden et al. | 369/59.12 |
| 6,567,371 | * 5/2003 | Otomo et al. | 369/275.3 |
| 6,577,805 | * 6/2003 | Hirai | 386/46 |
| 6,795,383 | * 9/2004 | Yamamoto et al. | 369/47.16 |

OTHER PUBLICATIONS

U.S. Appl. No. 10/361,104 entitled "Method and System for Managing Optical Storage Medium File System Structures" naming Hong–Jing (James) Lo and Christiann Steenbergen as inventor and filed Feb. 7, 2003.

U.S. Appl. No. 10/376,807 entitled "Method and System for Reconditioning Optical Storage Media to Write Updated Information" naming Dean Hendrickson, Hong–Jing (James) Lo. And Christiann Steenbergen as inventors and filed Feb. 28, 2003.

* cited by examiner

*Primary Examiner*—Muhammad Edun
(74) *Attorney, Agent, or Firm*—Hamilton & Terrile, LLP; Robert W. Holland

(57) ABSTRACT

An optical medium storage device improves the usable life of re-writable optical storage mediums, such CD-RW, DVD+RW and DVD-RAM disks, by adjusting write parameters to compensate for time between an initial write on the optical storage medium and the current time, with adjusted write parameters fine-tuning signal-to-noise ratios and improving the number of reliable overwrites for the optical storage medium. A time compensator determines the time delta between an initial write on the optical storage medium, such as formatting of the medium, and the current time, and then applies the time delta to determine a time compensation factor that adjust the write parameters of a focused laser beam that writes information to the optical storage medium

20 Claims, 2 Drawing Sheets

METHOD AND SYSTEM FOR TIME COMPENSATION OF RE-WRITABLE OPTICAL MEDIA WRITE PARAMETERS

BACKGROUND OF THE INVENTION

1. Field of the Invention

The present invention relates in general to the field of re-writable optical media, and more particularly to a method and system for time compensation of re-writable optical media write parameters.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems continually improve in the ability of both hardware components and software applications to generate and manage information. As the amount of information generated by information handling systems increases, storage of generated information presents an increased challenge. One solution for storing information in removable media is provided by re-writable optical storage media, such as CD-RW, DVD+RW and DVD-RAM disks, which manage information in much the same manner as magnetic floppy disks. Re-writable optical storage media use phase change technology to "burn" information into a disk by altering the reflectivity of the disk material. A recording layer is included in the disk and made of phase change material that exhibits two solid phases at room temperature with different optical reflective properties. Information is stored by switching between the two phases with a focused laser beam that is pulsed in specific sequences in which the intensity and duration are varied to selectively alter the phase change material into the two phases. The information is read from the disk by illuminating the phase change material at low power with the focused laser and measuring the reflectivity of the phase change material. Most rewritable optical storage media withstand approximately 1000 rewrites before the written bit boundaries acquire too much noise for reliable read back. Some media, such as DVD-RAM withstand over 100,000 rewrites. In the following, the 1000 rewrite example will be used for demonstrative purposes.

One problem with re-writable optical storage media is that different media types and phase change materials can have varied phase change properties over time. In particular, phase change recording layers for higher speed recording are difficult to design since the melting, cooling and annealing properties of the materials have to be balanced. For example, with currently available phase change materials, recording speeds over 4 Mbytes/s, equal to 32×CD-RW or 4×DVD+RW, result in less consistent rewrite properties and different write requirements when recording for the first time versus subsequent recording. Under such conditions, if an optical storage medium is consistently recorded with the same initial power conditions, information stored on the optical storage medium becomes less reliable with a lower signal-to-noise ratio and the practical number of rewrites becomes substantially reduced, such as reduced from 1000 specified re-writes to less than 100 actually supported re-writes. Moreover, optimal recording subsequent to an initial recording often exhibits different responses with different time periods between the initial recording and the subsequent recording.

SUMMARY OF THE INVENTION

Therefore a need has arisen for a method and system which adjusts optical storage medium write parameters to compensate for variations over time in the properties of phase change materials used by the optical storage medium to store information.

In accordance with the present invention, a method and system are provided which substantially reduce the disadvantages and problems associated with previous methods and systems for recording information on an optical storage medium. Write parameters for writing information to the optical storage medium are adjusted to compensate for changes in recording properties based on the time delta between writes on the optical storage medium.

More specifically, a time compensator associated with an optical medium storage device adjusts write parameters used by the storage device to write information compensated for changes to that medium over time. The time compensator determines the time delta between a current write and a previous write by reading a time stamp from the optical storage medium and comparing the time stamp with the current time. For instance, a time stamp is stored on an optical storage medium at formatting of the optical storage medium or some other initial write of information. The time compensation factor adjusts one or more write parameters, such as recording power or pulse duration, by reference to a write parameters table or with generic adjustments in order to fine tune subsequent recordings based on the time delta to improve signal-to-noise ratio and the number of available overwrites to re-writable optical storage media including CD-RW, DVD-RAM and DVD+RW disks.

The present invention provides a number of important technical advantages. One example of an important technical advantage is that optical storage medium write parameters are adjusted to compensate for variations over time in the properties of recorded phase change materials used by the optical storage medium to store information. Adjusting write parameters allows fine-tuning of information recording based upon a timed delta between writes to improve signal-to-noise ratio and the number of reliable overwrites achievable on a given optical storage medium. Storage of a time stamp at format of the optical storage medium provides a convenient reference to determine the time delta between an initial write and a subsequent write.

BRIEF DESCRIPTION OF THE DRAWINGS

The present invention may be better understood, and its numerous objects, features and advantages made apparent to FIG. 1 depicts a block diagram of an information handling system and time compensated optical storage device.

DETAILED DESCRIPTION

Time stamps stored on a re-writable optical storage medium are compared with current time information to determine a time compensation factor for writing information to the optical medium. An optical storage device of an information handling system adjusts write parameters with the time compensation factor to fine tune writing of information from the information handling system to the optical storage medium. For purposes of this application, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
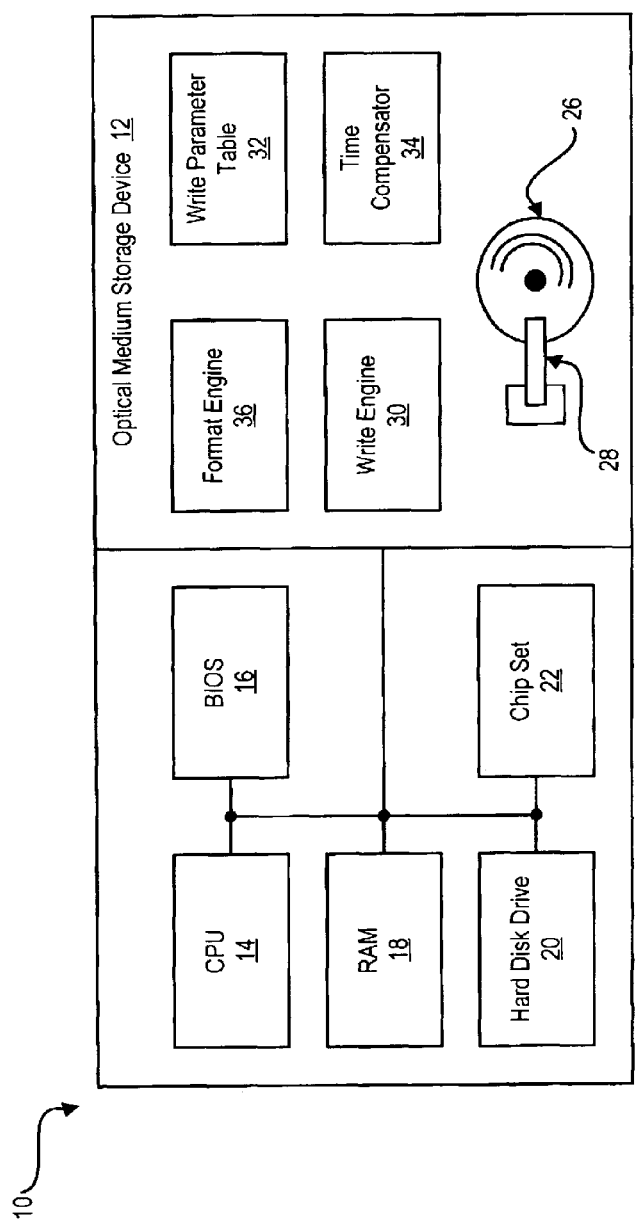

Referring now to FIG. 1, block diagram of an information handling system 10 having a time compensated optical medium storage device 12 is depicted. Information handling system 10 includes components that generate information for storage on an optical storage medium 26 by optical medium storage device 12. For instance, applications running on a CPU 14 coordinate with BIOS 16, RAM 18, hard disk drive 20 and chip set 22 to transfer generated information through bus 24 to optical medium storage device 12 for storage on optical medium 26. A focused laser 28 moves across optical medium 26 to write generated information by pulsing a focused laser beam in specific sequences with a selectively set pulse intensity and duration. The focused laser beam "burns" the information onto the optical storage medium as a string of data points having varying reflectivity and/or duration readable as the information by laser beam 28 at a low power.

Optical storage medium 26 is a re-writable medium, such as a CD-RW, DVD-RAM or DVD+RW disk, that has a recording layer made of phase change material. Focused laser 28 alters the phase change material by switching between phases to change the reflective optical properties and record the information. A write engine 32 selects write parameters for focused laser 28 to heat the phase change material to produce desired reflectivity properties. A write parameter table 32 stores write parameters associated with different types of disks or phase change materials so that focused laser 28 writes information with an appropriate laser beam. For instance, write parameters include write power, pulse width, timing and step power. The phase change material alters its response to focused laser 28 over time when the response of the material at a first write is compared with the response of the material at subsequent writes. After a number of writes, repeated melting, cooling and annealing of the phase change material leads to wear-out of the material, failure of the recording to or read back from the optical medium.

A time compensator 34 interfaces with write engine 30 to adjust the write parameters applied to focused laser 28 in order to compensate for variations in the response of phase change material to the focused laser beam due to the time delta between the first write on the optical medium and the current time. Time compensator 34 keeps current time and/or polls information handling system host 10 for current time to compare with a time stamp. Write engine 30 reads a time stamp stored on optical storage medium 26 that indicates the time of the initial write on optical storage medium 26. For instance, on initial use of an optical storage medium, a format engine 36 writes the current time as the time stamp to a non-user accessible area of the optical storage medium, such as areas allocated in optical storage specifications for use by the manufacturers of optical storage media or optical storage medium devices. Time compensator 34 determines a time delta for the optical storage medium by determining the amount of time that has passed between initial write indicated by the time stamp and the current time. The time delta determines a time compensation factor that adjusts the write parameters used by write engine 30 to write the information to optical storage medium 26. For instance, write power is adjusted up or down from a base-line write power with the size of the adjustment related to the length of the time delta. As another example, specific media or phase change material types have time compensation factors stored in write parameter table 32. Time compensation factors are, for instance, determined by experimentation with samples of media to fine-tune the write parameters to minimize signal-to-noise ratios and increase the number of available over-writes over the life span of an optical storage medium.

Figure 2:
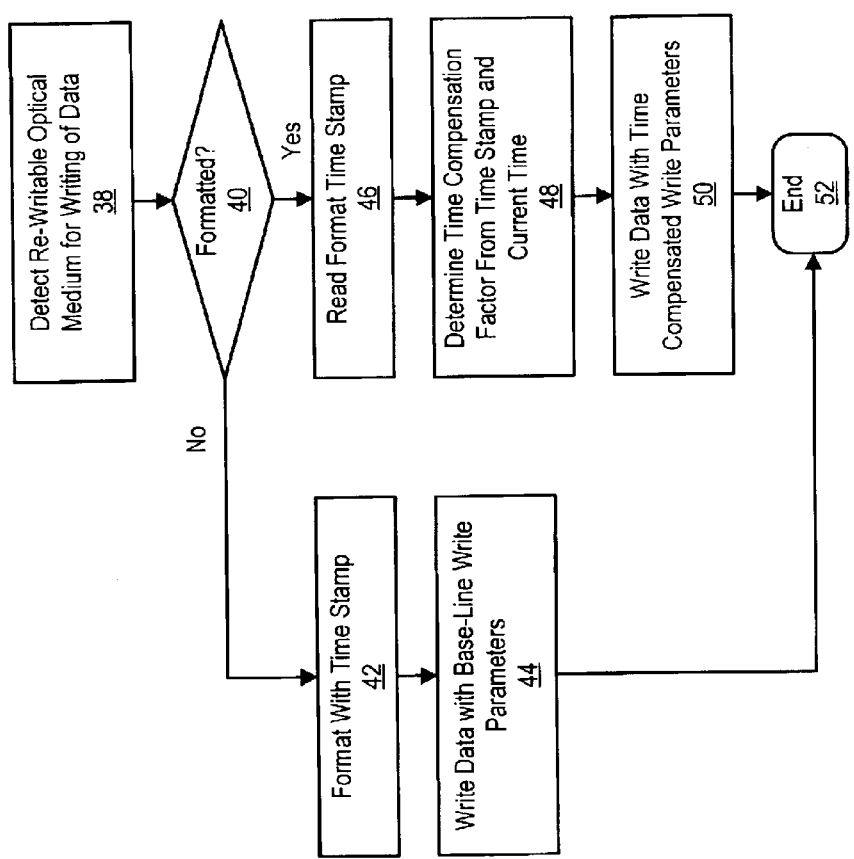
FIG. 2 depicts a flow diagram of a process for time compensated writing of information to a re-writable optical medium.

Referring now to FIG. 2, a flow diagram depicts a process for time compensated writing of information to a re-writable optical storage medium. The process begins at step 38 with detection of a re-writable optical storage medium for the writing of information inserted in the optical medium storage device. At step 40, a determination is made of whether the optical storage medium is formatted. If no, then the optical storage medium has not had an initial write and the process proceeds to step 42 for formatting of the optical storage medium, including storing a time stamp with the current time. At step 44, the process continues with the writing of the information to the optical storage medium using base-line write parameters, for instance by setting the time delta to zero, and the process ends at step 52.

If at step 40 a determination is made that the optical storage medium is formatted, the process continues to step 46 to read the time stamp stored on the optical storage medium at the format time. If no time stamp is found, the time delta is set to zero or, alternatively, a time stamp is estimated from dates associated with stored data. At step 48, a time compensation factor is determined by determining the time delta between the formatted time stamp and the current time, and by then applying the time delta to the optical storage medium type. For instance, a time compensation factor for a detected optical medium storage type is looked up in the write parameter table based on the computed time delta. At step 50, the information is written to the optical storage medium with the time compensated write parameters so that the focused laser fine-tunes writes by the focused laser beam to reduce signal-to-noise ratios and increase optical storage medium life span. Once the information is written, the process ends at step 52.

Although the present invention has been described in detail, it should be understood that various changes, substitutions and alterations can be made hereto without departing from the spirit and scope of the invention as defined by the appended claims.

What is claimed is:

1. An information handling system for writing information to an optical medium, the information handling system comprising:

components operable to generate the information;

an optical storage device operable to write the generated information to the optical storage medium with selectable write parameters; and a time compensator associated with the optical storage device and operable to read a time stamp from the optical storage medium, to determine a time delta between the time stamp and the time of the write of the information, and to select write parameters for writing the information to the optical storage medium based at least in part on the time delta.

2. The information handling system of claim 1 wherein the time compensator is further operable to determine if a time stamp is absent on the optical storage medium and to write a time stamp if absent, the write stamp of the time of the write.

3. The information handling system of claim 1 wherein the optical storage medium comprises a re-writable medium.

4. The information handling system of claim 3 wherein the re-writable optical storage medium comprises a DVD+RW disk.

5. The information handling system of claim 3 wherein the re-writable optical storage medium comprises a CD-RW disk.

6. The information handling system of claim 1 wherein the optical storage medium comprises a user accessible area and a user inaccessible area, and wherein the time stamp is written to the user inaccessible area.

7. The information handling system of claim 1 wherein the optical storage device further comprises a write parameter table having plural sets of write parameters, each set of write parameters associated with a different optical medium type, and wherein the time compensator determines the type of optical medium accepting the information and writes the information with the write parameters adjusted to compensate for the time delta.

8. A method for writing information to an optical medium, the method comprising:

determining a time stamp stored on the optical medium;

comparing the stored time stamp with the current time to determine a time compensation factor; and writing the information to the optical medium with write parameters adjusted for the time compensation factor.

9. The method of claim 8 further comprising:

determining that a time stamp is not stored on the optical medium;

storing the current time on the optical medium as the time stamp.

10. The method of claim 9 wherein determining that a time stamp is not stored on the optical medium further comprises determining that the optical medium is not formatted and storing the current time on the optical medium as the time stamp further comprises formatting the optical medium to include the time stamp.

11. The method of claim 8 wherein the optical medium comprises one of plural re-writable optical medium types, each re-writable optical medium type having associated write parameters.

12. The method of claim 11 wherein the re-writable optical medium comprises a DVD+RW disk.

13. The method of claim 11 wherein the re-writable optical medium comprises a CD-RW disk.

14. The method of claim 11 wherein the write parameters comprise the write pulse duration.

15. The method of claim 11 further comprising:

determining the optical medium type;

determining the write parameters associated with the optical medium type; and adjusting the determined write parameters for the optical medium type by the time compensation factor.

16. An optical medium storage device comprising:

a laser operable to write information to an optical medium with selectable write parameters and to read information from the optical medium;

a write engine interfaced with the laser and operable to command the writing of information at selected write parameters and the reading of information; and a time compensator interfaced with the write engine and operable to read a time stamp from the optical medium, the time compensator further operable to compare the time stamp and current time to compute a time compensation factor to adjust the write parameters selected by the write engine.

17. The optical medium storage device of claim 16 further comprising an optical medium disposed for writing and reading by the laser and having a time stamp stored for computing the time compensation factor, the time stamp comprising the time of the first write to the optical medium.

18. The optical medium storage device of claim 17 wherein the optical medium comprises a DVD+RW disk.

19. The optical medium storage device of claim 17 wherein the optical medium comprises a DVD-RAM disk.

20. The optical medium storage device of claim 17 wherein the optical medium comprises a CD-RW disk.

* * * * *